June 8, 1971   B. M. ALLISON   3,584,111
METHOD AND APPARATUS FOR MOLDING PLASTIC ARTICLES
Filed Oct. 3, 1968   3 Sheets-Sheet 1

INVENTOR.
BLAINE M. ALLISON
BY Philip M. Rice
& E. J. Holler
ATTORNEYS

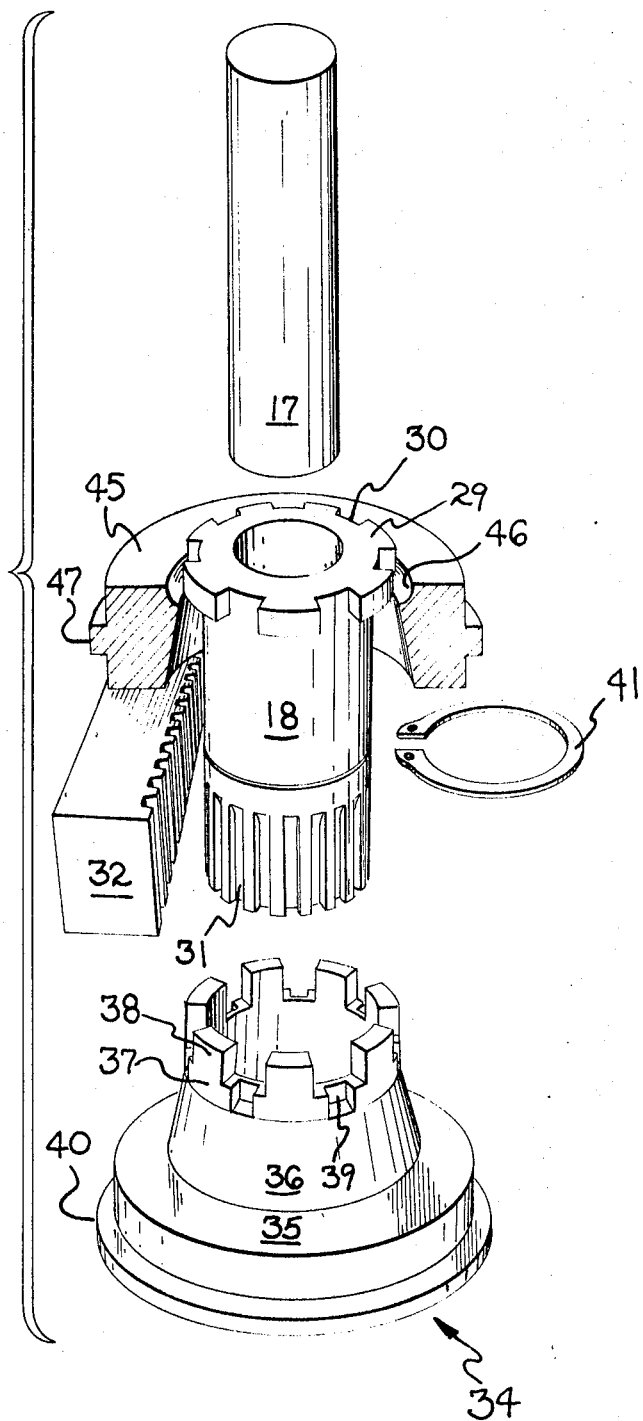

United States Patent Office 3,584,111
Patented June 8, 1971

3,584,111
METHOD AND APPARATUS FOR MOLDING PLASTIC ARTICLES
Blaine M. Allison, Toledo, Ohio, assignor to Owens-Illinois, Inc.
Filed Oct. 3, 1968, Ser. No. 764,837
Int. Cl. B28b 7/10
U.S. Cl. 264—318                    2 Claims

ABSTRACT OF THE DISCLOSURE

Method and apparatus are provided for forming a plastic closure having lugs formed on the inner surface of the skirt. The inner surface is molded around a novel force plug which permits the closure to be readily removed therefrom without interference from the lugs. The force plug has a plurality of elements which cooperate to define the molding surface for the inner portion of the closure including a plurality of cavities in which the lugs are to be formed. The elements are movable both axially and rotatively relative to one another to provide, upon completion of the molding operation, an open passage for the closure with its integrally formed lug to be removed axially therefrom.

BACKGROUND OF THE INVENTION

In the molding of plastic closures, it is frequently desirable to provide internally disposed lugs. Heretofore, such internally disposed lugs have been formed around a collapsible force plug. Although collapsible force plugs are well known in the molding of plastic articles, their complexity and the inherent problems with malfunctioning, coupled with their relatively high cost has resulted in a general reluctance on the part of molders to utilize them except when absolutely necessary.

The present invention provides a method and apparatus for forming closures having inwardly directed lugs at less expense and with more reliability than has heretofore been possible.

Accordingly, it is an object of the present invention to provide a method and apparatus for forming closures or similar articles having lug portions.

It is another object of the present invention to provide a new force plug for forming the inner surface of a closure, including one or more inwardly facing lugs, which is simple to operate and which has great reliability.

Other objects and advantages of the present invention will become readily apparent from the annexed sheets of drawings on which:

FIG. 5 is an exploded view of the force plug.

Figure 4:
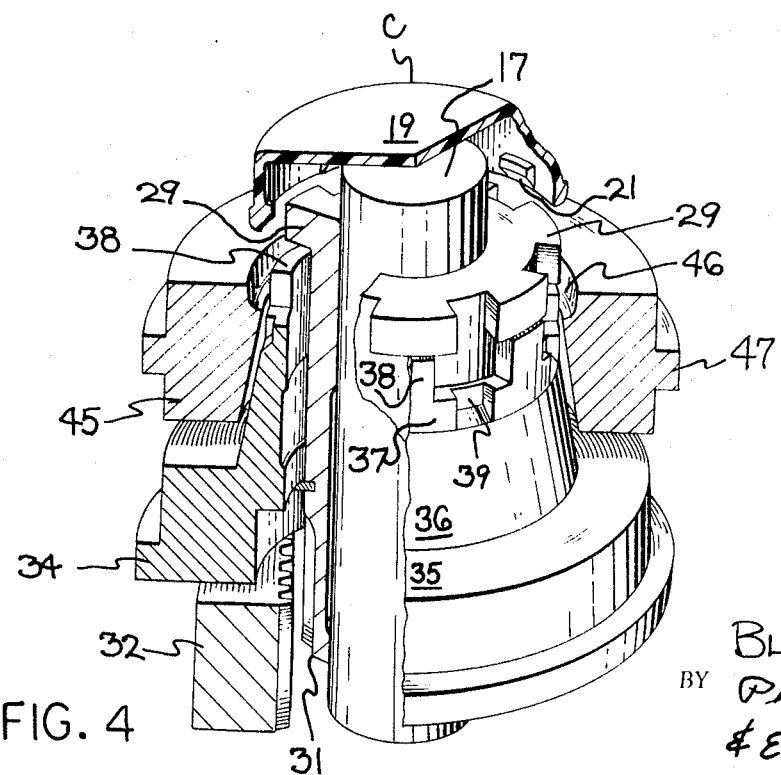
FIG. 4 is a view similar to FIG. 3 showing the central pin in an extended position to eject the closure from the force plug.

Referring now to the drawings, there is provided a mold 10 having an insert 11 cooperating to define a cavity 12 having a configuration corresponding to that of the exterior surface of the closure to be molded. Positioned partially within the cavity and cooperating with the mold 10 is a force plug designated generally by the numeral 15. The force plug 15 cooperates with the mold 10 to define a closed molding chamber in which heated thermoplastic material may be injection molded to form a closure C. The closure C includes a top panel 19 having an annular skirt 20 depending therefrom. Extending inwardly from the skirt 20 are a plurality of lugs 21 (see FIG. 4). The closure C is molded by injecting heated thermoplastic material into the molding chamber from a conventional extruder (not shown) by way of a sprue channel 16 formed in the insert 11.

The force plug 15 includes an elongated pin 17 about which is telescoped an elongated annular member 18. The elongated annular member 18 terminates at its free end in one or more radially outwardly extending flanges 29. As will be seen, there should be one outwardly extending flange 29 for each lug 21 to be formed on the closure skirt. A space 30 is provided between each of the outwardly extending flanges 29. The lower end of the elongated annular member 18 is provided with a splined portion 31 adapted to mesh with a rack gear 32 which, upon longitudinal movement, rotates the annular member 18.

Encircling the elongated annular member 18 is an inner sleeve 34 which may be moved axially relative to the annular member 18 and which may remain in a fixed position during rotation of the annular member 18. The inner sleeve 34 includes a lower supporting section 35 from which extends a tapering section 36. Extending upwardly from the tapering section 36 is a cylindrical section 37. As may be seen from FIG. 1, when the parts are in molding position, the cylindrical section 37 extends upwardly to a position flush with the upper end of the annular member 18 and the elongated pin 17 and cooperates therewith to define the molding surface for the interior of the closure top panel 19. As such, the cylindrical section 37 is provided with legs 38 which fit snugly in the spaces 30 between the outwardly extending flanges 29. Additionally, the cylindrical section 37 is provided with a plurality of recessed portions 39 in which the lugs 21 are molded. The upper face of the lugs are molded against the lower face of the outwardly extending flanges 29.

Figure 1:
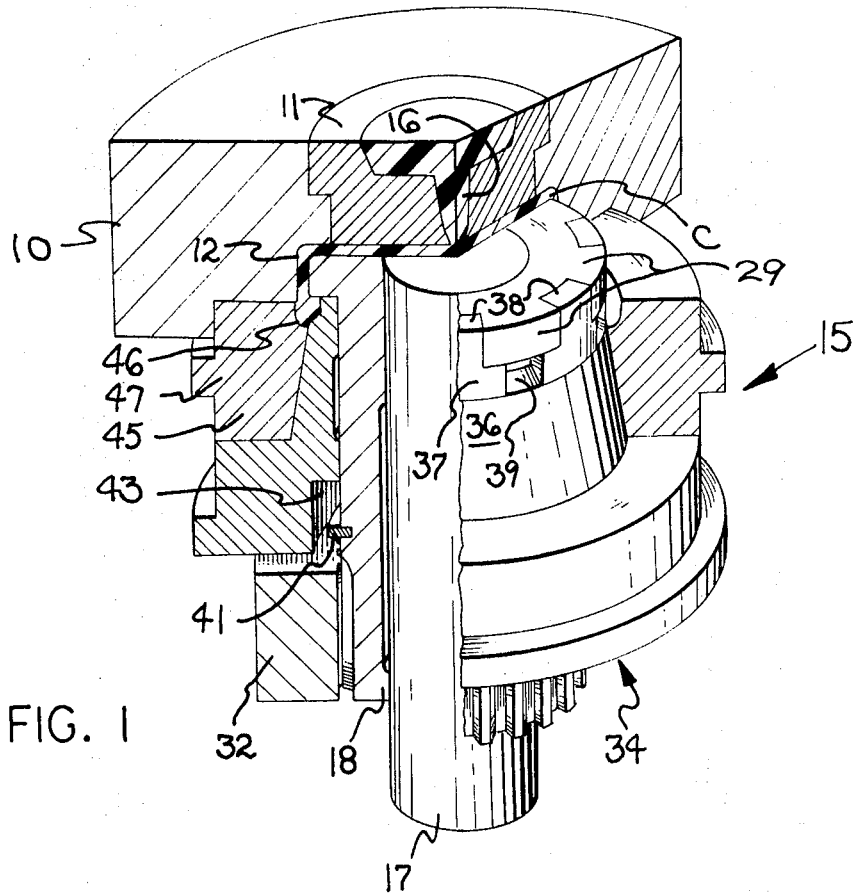
FIG. 1 is a perspective view of the apparatus of the present invention during the molding step with certain elements broken away for clarity.

As may be seen from viewing FIG. 1, the inner surface of the closure is defined by the outer surface of the respective flanges 29 and by the outer surface of the cylindrical section 37 including the legs 38. Additionally, it will be seen that the outwardly extending flanges 29 fit snugly within the spaces between the legs 38 of the cylindrical section 37. Extending radially outwardly from the supporting section 35 is a flange 40 to which any desired power means may be secured for imparting axial movement to such inner sleeve 34. If desired, a split locking ring 41 may be secured in a groove 42 of the annular member 18. The ring 41 extends outwardly into a recessed portion 43 of the inner sleeve 34 and serves to limit the axial movement of such sleeve relative to the annular member 18.

Encircling the tapering section 36 of the inner sleeve 34 is an outer sleeve 45. The outer sleeve 45, when in molding position, rests upon the supporting section 35 of the inner sleeve and snugly engages the tapering section 36. The outer sleeve 45 is provided with an annular groove 46 which is contoured to define the bottom edge of the closure skirt and the outer transition area adjacent thereto. The outer sleeve 45 is provided with an outwardly extending flange 47 to which power means may be engaged for imparting axial movement thereto.

Figure 2:
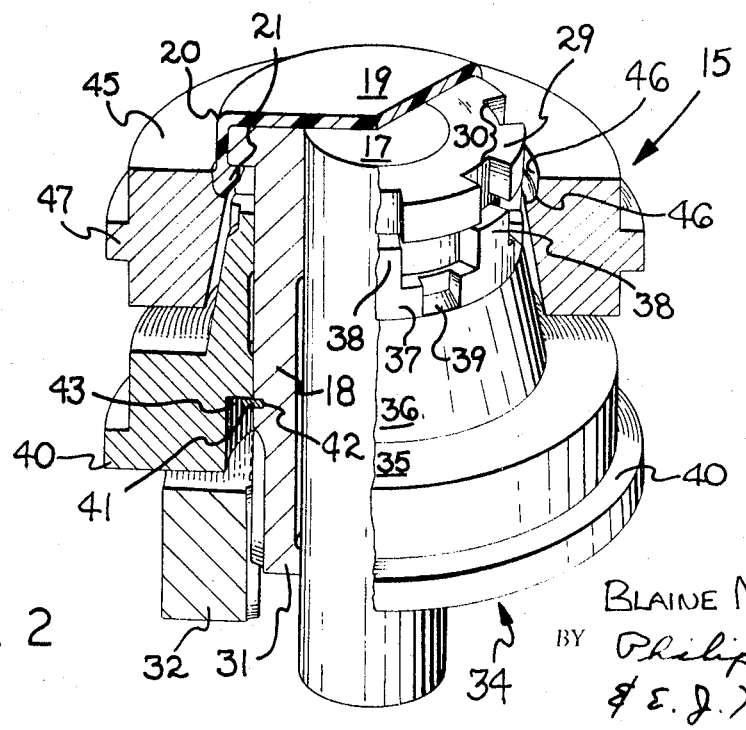
FIG. 2 is a perspective view of the force plug showing relative movement between certain elements preparatory to removing the closure therefrom.

In operation, the force plug 15 is engaged to the mold 10 and heated thermoplastic material is introduced to the molding chamber through the sprue channel 16 from any desired source. After the plastic material has cooled sufficiently to set, the force plug 15 is removed from the mold 10 carrying with it the closure C. The closure is then removed from the force plug by following the sequence of steps illustrated in FIGS. 2, 3 and 4.

Initially, the inner sleeve 34 is moved downwardly with respect to the other elements of the force plug 15. Such downward movement serves to remove the legs 38 from the spaces 30 between the respective outwardly extending flanges 29 of the annular member 18. This is the position illustrated in FIG. 2. It will also be noted that such lowering also removes the recessed portions 39 from the closure lugs 21.

Figure 3:
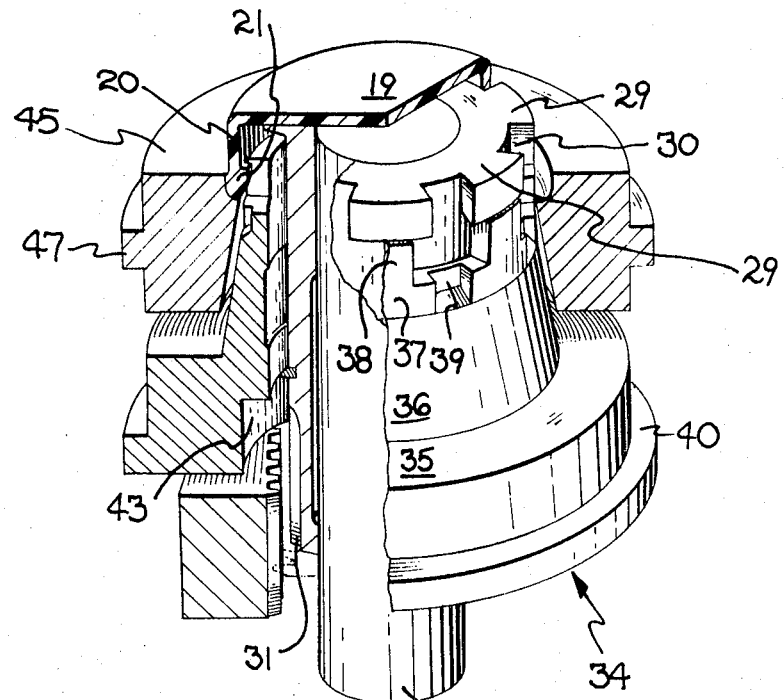
FIG. 3 is a view similar to FIG. 2 showing further relative movement between the elements thereby leaving free passage for the closure with the lug to be removed therefrom.

Thereafter, as illustrated in FIG. 3, the rack gear 32 is shifted to rotate the annular member 18 to cause the spaces 30 between the outwardly extending flanges 29 to become aligned with the recessed portions 39 of the inner sleeve 34 and, hence, with the lugs 21 of the closure C. Such alignment thus permits the closure C to be removed from the force plug by a simple axial movement. As may be seen by viewing FIG. 4, such axial movement may be accomplished by simply extending the elongated pin 17.

It can be seen from the foregoing, that the present invention provides a very reliable method and apparatus for forming closures having lug portions extending inwardly from the inner surface of the skirt.

Although the operation of the present invention has been described in conjunction with injection molding, it should be understood that it can also be utilized with other types of molding operations, such as compression molding, for example.

Several modifications will become readily apparent to those skilled in the art. Accordingly, the scope of the present invention should be measured only by the scope of the claims appended hereto.

I claim:

1. The method of molding a plastic closure having a top panel, an annular depending skirt and a plurality of inwardly extending lugs formed at the lower edge of said skirt portion comprising the steps of positioning a three-piece force plug within a closure defining cavity to mold the plastic closure as an integral unit, axially withdrawing a first portion of said force plug to release the lugs on the formed closure and open channels in a second portion of the force plug to the inner panel surface of the formed closure, rotating the second portion of the force plug to align the channels therein with the lugs on the formed closure, and axially moving a third portion of the force plug relative to the second portion to thereby lift the completed closure free of the force plug.

2. Apparatus for forming a plastic closure having a top panel, an annular skirt depending from said top panel and at least one lug extending inwardly from the inner surface of said annular skirt comprising
   (a) a female mold having a cavity and
   (b) a force plug receivable in said cavity and cooperable with said female mold to define a molding chamber having a configuration corresponding to the desired configuration of the closure, said force plug including
   (i) an elongated pin positioned axially of said molding chamber and having a free end and a supported end, said free end forming a molding surface for the central interior of said top panel,
   (ii) an elongated annular member encircling said pin and having one end aligned with said free end when in molding position, at least one flange extending radially outwardly from said one end, the outer face of said flange forming a molding surface for a portion of the interior of said skirt, the surface of said flange opposite said one end forming a molding surface for the top of said lug,
   (iii) an inner sleeve member encircling said elongated annular member and cooperating therewith to define the remaining molding surface for the interior of said closure, said inner sleeve having one end aligned with said free end when in molding position and having (1) at least one recessed portion extending from said one end and sized to snugly receive said flange and (2) a notch in the lower portion of said recessed portion forming a lug defining cavity,
   (iv) an outer sleeve member encircling said inner sleeve member, said outer sleeve member having an annular groove defining a molding surface for the free end of said annular skirt of said closure,
   (v) said inner sleeve being mounted on said elongated annular member for limited relative, axial movement whereby upon removal of said force plug from said female mold with a newly molded closure thereon movement of said inner sleeve axially with the closure supported by the elongated member serves to strip the lug out of said notch and means connected to said elongated annular member for imparting relative rotation between said elongated member and said closure to mis-align the flange and the lug to permit removal of the closure therefrom.

References Cited

UNITED STATES PATENTS 1,901,205    3/1933    Tregoning    18—42(M)
3,057,014    10/1962    Kirch    264—344X H. A. KILBY, JR., Primary Examiner U.S. Cl. X.R.

18—42; 264—334